May 30, 1961    A. B. ACIEGO    2,986,208
TORCH LIGHTER
Filed June 20, 1960
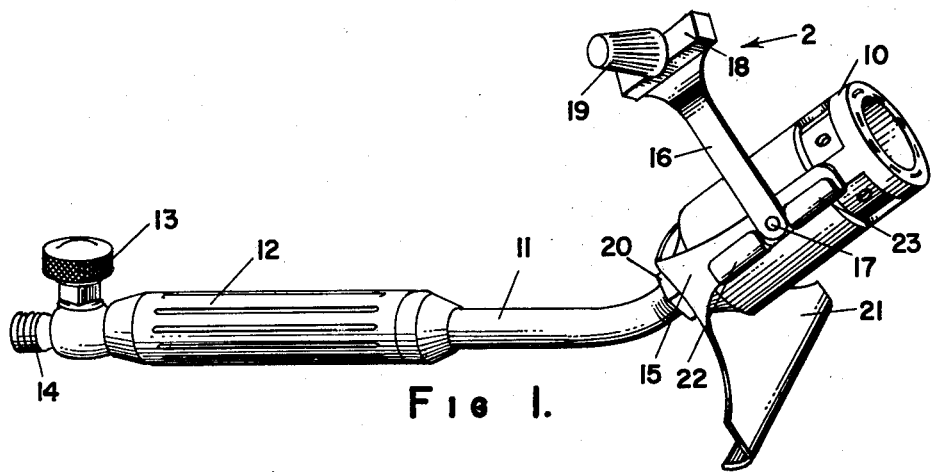
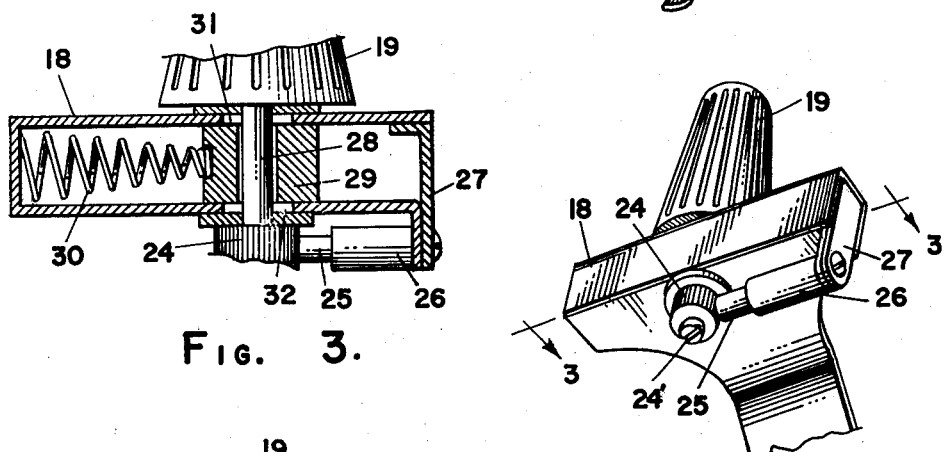
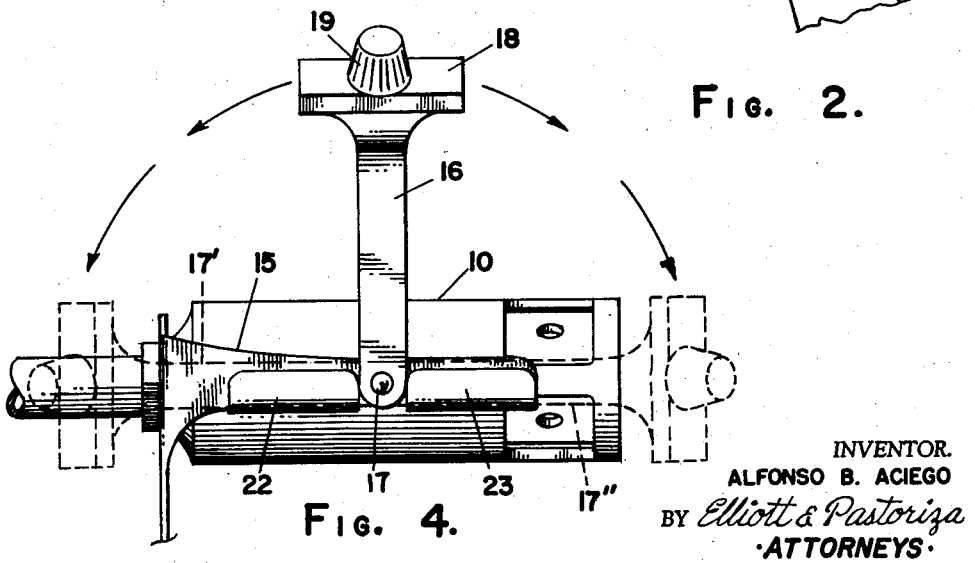
INVENTOR.
ALFONSO B. ACIEGO
BY *Elliott & Pastoriza*
·ATTORNEYS·

United States Patent Office 2,986,208
Patented May 30, 1961

2,986,208
TORCH LIGHTER
Alfonso B. Aciego, 15227 Freeman Ave., Lawndale, Calif.
Filed June 20, 1960, Ser. No. 37,386
3 Claims. (Cl. 158—27.4)

This invention relates to a novel lighter structure for use with torches to facilitate lighting of the torches.

Conventional liquid and gas blow torches are initially ignited by either matches or a conventional cigarette lighter. In the event matches are used, it is usually necessary for the operator to place the torch on a table or floor and use both hands for igniting the end of the torch nozzle after turning on the gas line flow to the nozzle. In using a conventional cigarette lighter, the operator can generally hold the torch with one hand and the lighter with the other. It is still necessary however to turn the gas on, and this results in some delay. In other words, the cigarette lighter, or matches as the case may be, must be temporarily set aside while turning on the gas or otherwise awkwardly held in the hand in some manner.

In the case of many types of blow torches, the torch structure is generally circular, particularly the nozzle portion of the torch. As a consequence, simply placing the torch on a table or the floor can result in the torch rolling or moving to an awkward position for lighting.

In addition to the foregoing, oftentimes a torch may become inadvertently extinguished. For example, if the air-to-fuel ratio becomes too high, the torch can blow itself out. In such instances, it is then necessary for the operator to re-ignite the torch after making suitable adjustments. If such re-ignition is necessary in the middle of a particular heat treating operation, the resulting delay may be harmful to the particular operation in question.

With the above in mind, it is a primary object of the present invention to provide a novel torch lighting mechanism which greatly facilitates initial and subsequent lighting of torches so that an operator may more effectively carry out a heat treating, welding, or other operation requiring a torch.

More particularly, it is an object of this invention to provide a novel torch lighter means which is adapted to be secured to the torch itself so as to be always available for instant use to the end that an operator may quickly ignite or re-ignite the torch with a minimum of manual operations and in minimum time.

Another object of the invention is to provide a novel torch lighter structure for cooperation with a torch which includes as a portion thereof a convenient stand for the torch so that the torch may be placed on a table or floor in a given position and held in such position.

Still another object is to provide a novel torch lighter which is adapted to be secured to the torch itself and which may be swung between an inoperative or out-of-the-way position when not in use to an operative or lighting position in front of the torch nozzle for igniting the torch.

An auxiliary object is to provide an improved lighter means in which positive operation of the lighter is insured each time it is used.

Other objects of the invention are to provide an improved torch lighter structure which employs a minimum number of separate components and thus is reliable, may be economically manufactured, and readily adapted to different types of torches.

Briefly, these and many other objects and advantages of this invention are attained by providing a basic mounting means adapted to be secured to a side of the torch. A lighter support arm, in turn, is pivoted at one end to the mounting means so that the lighter may be swung from an inoperative position relative to the torch to an operative position for lighting the torch. Preferably, the mounting means consists of an integral strip of metal having a straight portion for extension along the lateral side of the nozzle of the torch including bent-up tabs defining front and rear arm supporting cradles on either side of the arm pivot so that the arm and lighter means may be swung between the cradles through an arc of 180 degrees from a first position in which the lighter means is out of the way of the operation of the torch, to a second position in which the lighter means is disposed in front of the torch for lighting the same. The integral mounting strip may also include a widened downwardly extending bent portion defining a stand for the torch.

The lighter means preferably comprises a lighter head having a hollow interior incorporating a slide block having a transverse bore for carrying a shaft supporting a flint wheel. The slide block is biased to maintain engagement of the flint wheel with a suitable flint supported in a flint cartridge secured to the head. By this arrangement, proper engagement will be maintained notwithstanding the flint may become shorter from constant use.

A better understanding of the invention will be had by referring to a preferred embodiment thereof as illustrated in the accompanying drawings, in which:

Figure 1 is an overall perspective view illustrating the improved torch lighter as applied to one type of torch in accordance with the present invention;

Figure 2 is an enlarged rear perspective view of the lighter means looking in the direction of the arrow 2 of Figure 1;

Figure 3 is a partial cross section taken generally in the direction of the arrows 3—3 of Figure 2; and Figure 4 is a side elevational view of the torch lighter useful in explaining the operation of the invention.

Referring first to Figure 1, there is shown a butane type gas torch including a generally cylindrically shaped nozzle 10 provided with suitable window openings and bores for admitting air for mixing with the gas passed through the nozzle. As shown, the nozzle is connected to the end of a feed tube 11 including a handle portion 12 terminating in an on-off valve 13. The other end of the valve 13 includes threads 14 for connection to a suitable flexible tube passing from a butane tank or other supply of gas for the torch.

The torch lighter of the invention includes a mounting means including an integral mounting strip having a straight portion 15 adapted to extend along a lateral side of the torch nozzle 10 as shown. A lighter support arm 16 in turn terminates in a pivot means 17 at an intermediate point of the straight strip portion 15. The other end of the arm 16 terminates in a lighter means including a lighter head 18 and manually rotatably operating knob 19.

In accordance with the particular embodiment chosen for illustrative purposes, the elongated mounting strip portion 15 is secured in position to the nozzle 10 by clamping a bent portion of the mounting itself between the threaded connection of the tube 11 to the nozzle 10 as indicated at 20. This bent portion of the mounting widens and extends downwardly to define a stand 21 for the torch. The strip portion 15 includes upwardly bent tabs 22 and 23 spaced rearwardly and forwardly of the pivot 17 as shown. These tabs, respectively, define cradle means for receiving the arm 16 when the arm is swung in an arcuate circle about the pivot point 17 as will become clearer when the operation of the device is described.

Referring now to Figure 2, there is shown the lighter means itself wherein it will be noted that the operating knob 19 is arranged to rotate a conventional flint wheel 24 secured by a left-hand threaded screw 24' in position to engage a flint 25 within a flint cartridge 26. The flint cartridge 26 is secured to the lighter 18 as by strip 27.

Figure 3 shows in greater detail the construction of the lighter head. As shown, the knob 19 and flint wheel 24 are connected by a shaft 28 passing through the hollow interior of the head 18. This interior includes a slide block 29 having a bore through which the shaft 28 passes. Slide block 29 is biased to the right-hand portion of the hollow interior by a spring 30. The entrance and exit openings 31 and 32 respectively for the head 18 are elongated as shown so that movement of the entire knob 19, shaft 28, and flint wheel 24 can take place to the right under the pressure of the bias spring 30.

With the foregoing arrangement, it will be evident that the flint wheel 24 is constantly biased against the flint 25 so that even though the flint may become worn, the wheel will maintain contact.

The operation of the overall torch lighter will be evident from the foregoing description. Thus, referring to Figure 4, the device is shown in side elevational view with the lighter arm 16 in a vertical position. The arm 16 as described heretofore is arranged to pivot about the pivot 17. When the lighter is not being used, the arm 16 is swung to the left to assume the dotted line position indicated at 17' wherein the arm 16 is received within the rear cradle defined by the tab 22. In this position, the lighter is adjacent the rear end of the nozzle 10 and is thus in an out-of-the way position and will not interfere with normal operation of the torch.

When it is desired to light the torch, either initially or subsequently should the same become extinguished, the arm 16 is simply and easily swung about the pivot 17 through 180 degrees to assume the dotted-line position shown at 17" wherein the lighter is then disposed adjacent the front end of the nozzle. Twirling of the knob 19 will then effect lighting of the torch.

As will be evident from both Figures 1 and 4, the lighter head 18 forms an angle with the arm 16 so that rotation of the knob 19 will throw the desired heated sparks from the flint 25 into the direct path of gases issuing from the nozzle 10. After ignition, the lighter is swung back to its normally inoperative position 17'.

From the foregoing, it will be evident that the present invention has provided an extremely simple torch lighter mechanism which may be readily adaptable to different types of torches. Further, it will be apparent that the structure may be extremely economically manufactured as a consequence of forming the strip portion 15, stand 21, and cradle tabs 22 and 23 out of a single sheet of stock metal. Further, as described, a single hole in the mounting sheet will enable ready fastening of the device between the tube 11 and nozzle 10 when employed with the type of torch illustrated in Figure 1.

Modifications that fall clearly within the scope and spirit of this invention will readily occur to those skilled in the art. The torch lighter is therefore not to be thought of as limited to the particular embodiment set forth merely for ilustrative purposes.

What is claimed is:

1. A torch lighter for securement to a lateral side of a torch, comprising, in combination: an integral mounting strip including a straight portion adapted to extend along said lateral side when said strip is secured to said torch; and a lighter support arm terminating at one end in pivot means pivoting said arm to a medial point on said straight portion, said arm terminating at its other end in lighter means, said straight portion including first and second upwardly bent tabs defining first and second receiving cradles for said arm on the rear and forward side of said pivot means respectively whereby said arm may be swung from a first position in which said arm is received in said first cradle means in an out-of-the-way position adjacent the rear end of said torch through an arc of approximately 180 degrees to a second position in which said arm is received in said second cradle means in an operative position to dispose said lighter means adjacent to the front end of said torch.

2. A torch lighter according to claim 1, in which said integral mounting strip includes a widened downwardly bent portion defining a stand for said torch.

3. A torch lighter according to claim 1, in which said lighter means includes a lighter head having a hollow interior; a slide block in said interior having a transverse bore therethrough; a shaft passing through said bore and terminating at one end in a flint wheel and at its other end in a manually operable knob for rotating said flint wheel; a flint secured to said head in engagement with said flint wheel; and biasing means in said head urging said slide block along said hollow interior in a direction to bias said flint wheel against said flint for maintaining said engagement.

References Cited in the file of this patent

UNITED STATES PATENTS

| | | |
|---|---|---|
| 560,092 | Ford et al. | May 12, 1896 |
| 1,662,333 | Quinn et al. | Mar. 13, 1928 |
| 2,826,904 | Williamson | Mar. 18, 1958 |

FOREIGN PATENTS

| | | |
|---|---|---|
| 97,468 | Switzerland | Jan. 16, 1923 |